A. B. SOWDEN.
POSITIVE BOTH WHEEL DRIVE DIFFERENTIAL.
APPLICATION FILED APR. 29, 1920.

1,422,144. Patented July 11, 1922.

INVENTOR
Albert B. Sowden
BY James V. Ramsey
ATTORNEY

UNITED STATES PATENT OFFICE.

ALBERT B. SOWDEN, OF COVINGTON, KENTUCKY.

POSITIVE BOTH-WHEEL-DRIVE DIFFERENTIAL.

1,422,144.   Specification of Letters Patent.   Patented July 11, 1922.

Application filed April 29, 1920. Serial No. 377,637.

*To all whom it may concern:*

Be it known that I, ALBERT B. SOWDEN, a citizen of the United States, residing at Covington, in the county of Kenton and State of Kentucky, have invented certain new and useful Improvements in Positive Both-Wheel-Drive Differentials, of which the following is a specification.

My invention relates more particularly to positive both wheel drive differentials for rear axles for use in automobiles, trucks, tractors and the like.

The objects of my invention are to prevent the slipping of either wheel when in soft or miry ground; to provide independent motive power for each rear wheel in order to operate it and move the vehicle in case either wheel becomes inoperative by breakage or otherwise; to provide means which will cause both rear wheels to revolve at all times and particularly when one wheel is jacked up so that the machine will move forward off of the jack without the necessity of lowering it; to provide a more economical differential construction and one which is more substantial and durable; to overcome the usual danger of breakage of parts and minimize the wear of parts, and to enable the parts to be more readily assembled or removed.

My invention consists in providing the differential with a driven bevel gear carried by a shaft on which is mounted two spur gears, each of which mesh with three gear segments which are held in place by a segment gear carrying plate, said gear segments taking hold and driving axle carrying drums either forward or backward and so arranged that one wheel can exceed the other in speed as in turning a corner.

Figure 1:
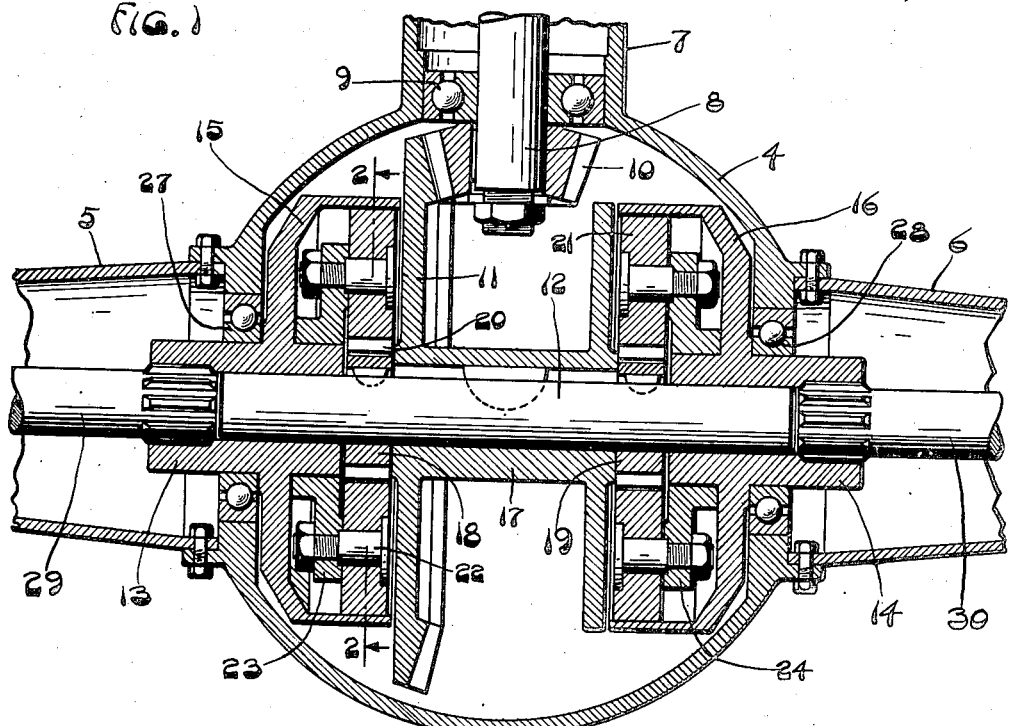
Fig. 1 is a horizontal section through the differential housing and connecting parts showing the driving shaft and axle in elevation.
Figures 2, 3:
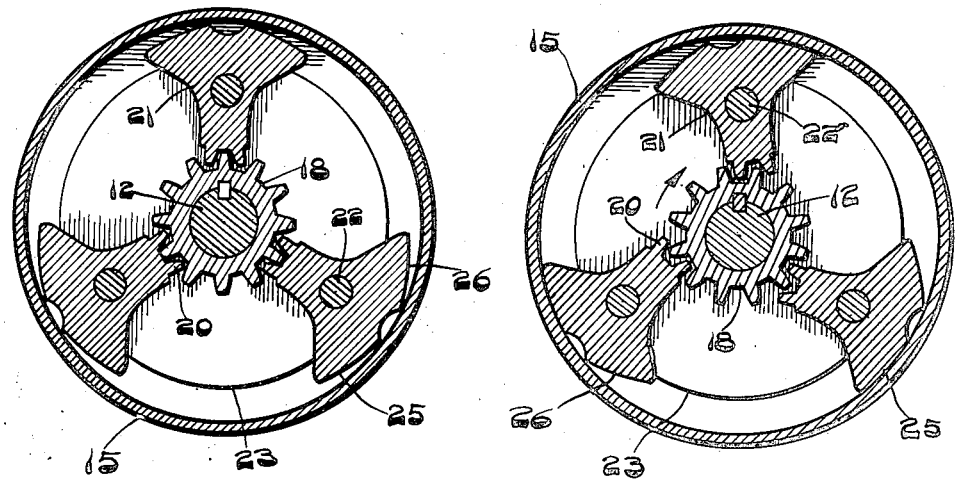
Fig. 2 is a transverse section on the line 2—2 of Fig. 1 showing segment gears in neutral position.
Fig. 3 is a sectional view showing the segment gears in working position.

In the embodiment of my invention as illustrated and which shows a preferred construction, a differential housing 4 contains the entire mechanism of my improved differential, axle housings 5 and 6 extending therefrom, with a drive shaft or torque tube housing 7 extending at a right angle to the axle housings. A drive shaft 8 is journaled within the torque tube upon the usual ball bearing 9 and has a bevel pinion 10 keyed thereto, which meshes with a large bevel gear 11 which is keyed to a short shaft 12 having bearing in the hubs 13 and 14 of the respective drums 15 and 16. On each side of the keyed hub 17 of gear 11 are pinions 18 and 19 which are also keyed to shaft 12. These pinions mesh with the teeth 20 at the inner ends of a series of cams 21 which are pivoted upon pins 22 extending from discs 23 and 24 which are mounted rotatively upon the inward extensions of drum hubs 13 and 14. The cam faces 25 and 26 are so shaped and positioned relatively to one another that when the shaft 12 is not being rotated by gear 11 to drive the car, the cams may be in the neutral or non-driving positions shown in Fig. 2, but when the driving shaft is rotated as indicated by the arrow in Fig. 3, cam surfaces 25 will be brought into engagement with the inner surfaces of the drums to grip them and thus drive them rotatively upon their bearings 27 and 28. The axle shafts 29 and 30 being splined to the drum hubs 13 and 14 as shown, will therefore be driven when the drums are rotated, to drive the vehicle forward. Reverse movement of the drive shaft will reverse the position of the cams and drive the car backward, bringing the cam faces 26 into gripping engagement with the drum in doing so.

An advantage attained by mounting the discs rotatively on the hubs 13 and 14 of the drums is that the slight friction of the discs thereon will always be sufficient to enable the cams 21 to be rotated by their pinions 18 and 19 to grip the drums, while at the same time leaving the drums free to rotate independently of the remaining parts of the differential as when the vehicle negotiates a turn or when going down hill. In my improved construction, a vehicle in going around a corner will drive on the inner wheel, the outer wheel being free to travel as fast as may be necessary, but when the straight way is reached, then both wheels will take up the duty of driving the car. In going down hill, should the car be inclined to run ahead of the engine speed, the drums are free to rotate faster if they are so inclined, but should the car speed become excessive then the friction of the discs on their mounting hubs will cause the cams to reverse and check the car to the speed of the engine, thus acting somewhat in the nature of a governor.

It will thus be seen that my improved differential has an advantage over the old form of differential in that in case of a broken wheel a skid can be used and the car, by means of my device, run home under its own power.

Another advantage lies in the ability of the differential to enable a machine to pull itself out of a mud hole should one wheel become mired therein, the old form of differential causing the mired wheel to revolve and no motion to be obtained from the drive wheel upon the solid ground.

A further advantage lies in the elimination of flimsy and expensive gears in present differential constructions with consequently less wearing parts.

It will also be seen that although I have shown the differential mechanism entirely located within the centrally positioned differential casing, the elements thereof can be divided and part put on each outer end of the axle, adjacent to each rear wheel.

An additional advantage lies in the fact that the construction cannot become locked and if one side should become damaged, the other side will still be workable.

There are no loose parts or springs to become disengaged or clogged with heavy grease and all the parts are mechanically operated. The cams or gear segments are so arranged that they cannot become wedged in the axle driving drum.

Having thus described my invention, what I claim is:

In a single differential housing supported by torque tube and axle housings, a short driven shaft within said housing, an axle in each axle housing, a pair of drums having hubs rotatively mounted on said short driven shaft and having detachable driving connection with said axles respectively, a gear fixed on the driven shaft, within each drum, a rotatively mounted disk in each drum, a series of double faced cams pivotally mounted on each disk adapted to be moved into clamping engagement with said drums respectively, in either direction and having gear teeth thereon meshing with the teeth of said gears, respectively, a beveled gear keyed on said short driven shaft between said drums and having means to close said drums, respectively, a beveled pinion engaging said beveled gear and a drive shaft on which said beveled pinion is keyed, substantially as set forth and for the purposes specified.

ALBERT B. SOWDEN.